(12) United States Patent
Li

(10) Patent No.: US 11,954,311 B2
(45) Date of Patent: Apr. 9, 2024

(54) INFORMATION PROCESSING METHOD, ELECTRONIC DEVICE AND STORAGE MEDIUM FOR ENHANCED OBJECT MANAGEMENT IN A MULTI-TASKING ENVIRONMENT

(71) Applicant: BEIJING XIAOMI MOBILE SOFTWARE CO., LTD., Beijing (CN)

(72) Inventor: Xiaodong Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 6 days.

(21) Appl. No.: 17/584,364

(22) Filed: Jan. 25, 2022

(65) Prior Publication Data

US 2023/0031021 A1 Feb. 2, 2023

(30) Foreign Application Priority Data

Aug. 2, 2021 (CN) .......................... 202110880280.X

(51) Int. Cl.
*G06F 3/04842* (2022.01)
*G06F 3/04817* (2022.01)

(52) U.S. Cl.
CPC ...... *G06F 3/04842* (2013.01); *G06F 3/04817* (2013.01); *G06F 2203/04803* (2013.01)

(58) Field of Classification Search
None
See application file for complete search history.

(56) References Cited

U.S. PATENT DOCUMENTS

| 2001/0035882 A1* | 11/2001 | Stoakley | G06F 3/0481 |
| | | | 715/779 |
| 2007/0186176 A1* | 8/2007 | Godley | G06F 3/0483 |
| | | | 715/779 |
| 2020/0272322 A1 | 8/2020 | Zhu et al. | |
| 2021/0056878 A1* | 2/2021 | Lee | G06F 3/041 |
| 2022/0291811 A1* | 9/2022 | Zhang | G06F 1/1652 |

FOREIGN PATENT DOCUMENTS

CN 111381737 A 7/2020

OTHER PUBLICATIONS

Microsoft Computer Dictionary (Non-Patent Literature), pp. 211 and 263-264 (Year: 2002).*
Extended European Search Report issued in EP Application No. 22153716.0, dated Jul. 13, 2022,(8p).
Rachit Agarwal, "20 Cool iOS 11 Features You Should Know About" last updated on Jun. 6, 2017, Retrieved from the Internet: URL:https://beebom.com/best-new-ios-11-features/, (31p).

* cited by examiner

*Primary Examiner* — William L Bashore
*Assistant Examiner* — Gabriel Mercado
(74) *Attorney, Agent, or Firm* — Arch & Lake LLP

(57) ABSTRACT

An information processing method including: displaying, based on an object file selected in a first display area, a file icon in a first sub-area of a second display area, where an application icon is displayed in a second sub-area; displaying an application interface of an object application in the first display area in response to detecting a first operation acting on the application icon; detecting a second operation acting on the file icon; and transmitting, in response to detecting the second operation, the object file to the object application to be processed by the object application.

19 Claims, 11 Drawing Sheets

INFORMATION PROCESSING METHOD, ELECTRONIC DEVICE AND STORAGE MEDIUM FOR ENHANCED OBJECT MANAGEMENT IN A MULTI-TASKING ENVIRONMENT

CROSS REFERENCE TO RELATED APPLICATION

The present application is based on and claims priority to Chinese Patent Application No. 202110880280.X, filed on Aug. 2, 2021, the entire content of which is hereby incorporated by reference for all purposes.

BACKGROUND

As the varieties of applications (APPs) keep growing, the applications to be installed in the electronic device by users are accordingly increased. However, an abundance of applications leads to inconvenience in use. With the task bar additionally arranged in the display area of the display screen, application icons in the task bar (also called as dock) facilitates quick start or display of some applications to a certain extent. However, most application icons displayed in the task bar correspond to the fixed applications, the display function is single, and the task bar is not well utilized.

SUMMARY

According to a first aspect of the disclosure, provided is an information processing method. The method includes: displaying, based on an object file selected in a first display area, a file icon in a first sub-area of a second display area, where the file icon is an icon corresponding to the object file, the second display area is located at an edge of the first display area, the second display area further includes a second sub-area, and an application icon is displayed in the second sub-area; displaying an application interface of an object application in the first display area when a first operation acting on the application icon is detected, where the object application is an application corresponding to the application icon on which the first operation acts; detecting a second operation acting on the file icon; and transmitting, when the second operation is detected, the object file to the object application to be processed by the object application.

According to a second aspect of the disclosure, provided is an electronic device. The electronic device includes: a processor, and a memory configured to store a processor-executable instruction, where the processor is configured to execute steps of the method in the first aspect when implemented.

According to a third aspect of the disclosure, provided is a non-transitory computer-readable storage medium storing a computer program. When an instruction in the storage medium is executed by a processor of an electronic device, the electronic device can execute and implement steps of the method in the first aspect.

It should be understood that the above general description and the following detailed description are merely examples and illustrative and could not limit the disclosure.

BRIEF DESCRIPTION OF THE DRAWINGS

The accompanying drawings, which are incorporated in and constitute a part of this specification, illustrate examples consistent with the disclosure and, together with the specification, serve to explain the principles of the disclosure.

DETAILED DESCRIPTION

Figure 1:
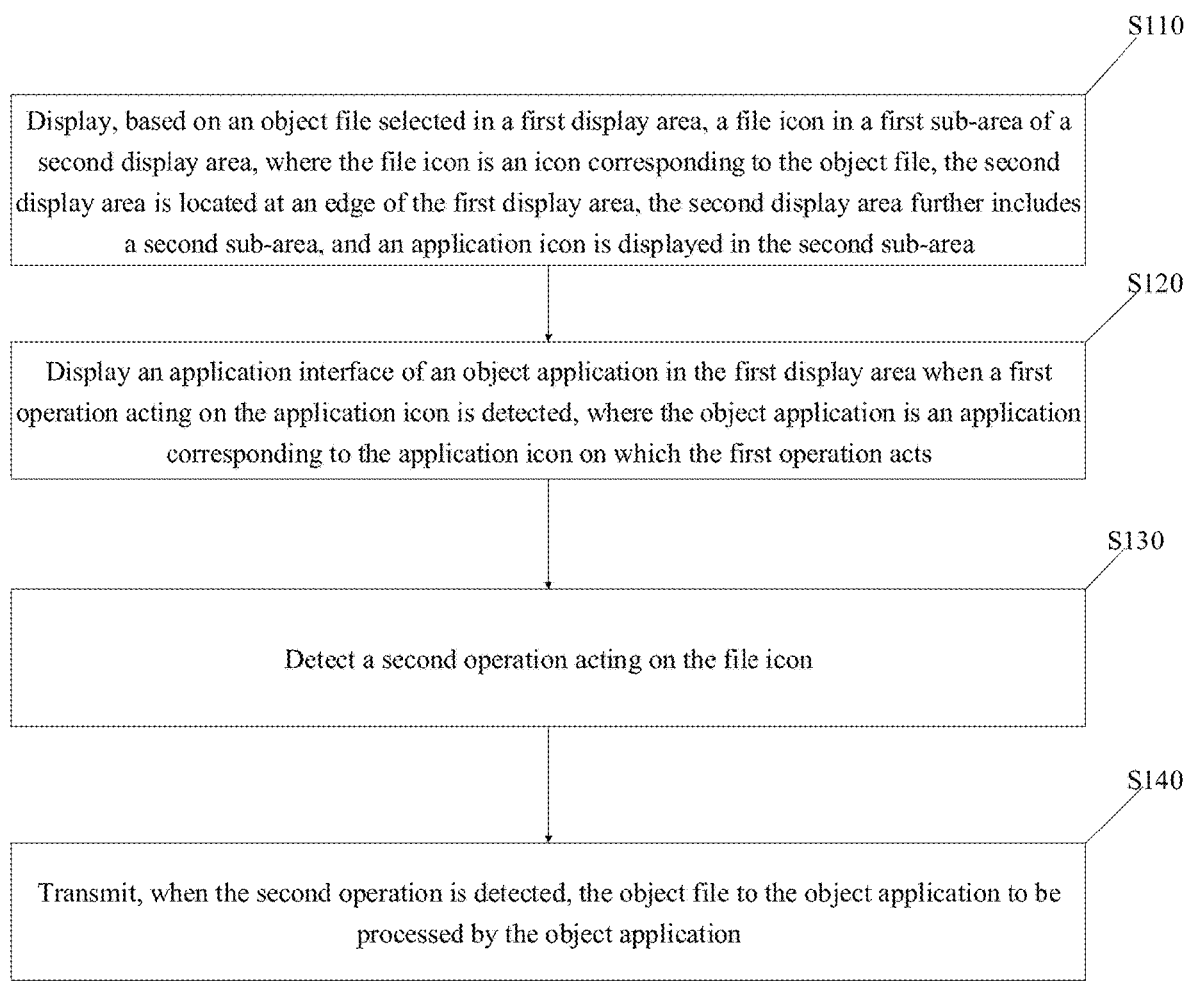
FIG. 1 is a first flowchart of an information processing method illustrated according to an example.

Explanation will be made in detail herein to examples, instances of which are illustrated in the accompanying drawings. When the following description refers to the accompanying drawings, the same numbers in different accompanying drawings refer to the same or similar elements unless otherwise indicated. The implementations described in the following examples do not represent all implementations consistent with the disclosure. Rather, they are merely examples of apparatuses consistent with some aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

An example in a first aspect of the disclosure provides an information processing method. As shown in FIG. 1, the method includes:

S110, display, based on an object file selected in a first display area, a file icon in a first sub-area of a second display area, where the file icon is an icon corresponding to the object file, the second display area is located at an edge of the first display area, the second display area further includes a second sub-area, and an application icon is displayed in the second sub-area;

S120, display an application interface of an object application in the first display area when a first operation acting on the application icon is detected, where the object application is an application corresponding to the application icon on which the first operation acts;

S130, detect a second operation acting on the file icon; and

S140, transmit, when the second operation is detected, the object file to the object application to be processed by the object application.

In S110, the second display area may be a display area of a dock. The first sub-area in the second display area is used for displaying the file icon corresponding to the object file, and the second sub-area is used for displaying the application icon. Compared with a way of displaying the application icon just in the display area of the dock, the example of the disclosure adds the first sub-area as an interaction area, so as to enrich functions of the second display area, and improves a use effect of the second display area.

Under the condition that a plurality of object files are selected, file icons are displayed in a centralized manner. That is, when the plurality of object files are selected, one file icon may be displayed in the first sub-area. Plurality refers to two or more.

In some examples, the file icon is displayed in the first sub-area of the second display area according to a type of the object file, where the file icon corresponding to at least one object file of the same type is displayed in a centralized manner, and display parameters of the file icons corresponding to the object files of different types are different. A difference of the display parameters may be at least one of: a display position difference; a display brightness difference; a display background color difference; and a display line difference.

By means of the difference of the display parameters, a difference between two file icons is reflected visually, so as to facilitate an operation by a user.

For example, the selected object file includes three image files and two audio files, one file icon corresponding to the image files and one file icon corresponding to the audio files may be displayed in the first sub-area, and lines of the two file icons are different.

In an example, the file icons of the object files may be displayed in a tiled manner in the first sub-area.

In another example, the file icons of the object files may be displayed in a cascaded manner in the first sub-area, and the file icon of the last selected object file is cascaded uppermost.

In another example, a plurality of object files are provided and are divided into a plurality of types, file icons of the object file of the same type are displayed in the first sub-area in a cascaded manner, and file icons of the object files of different types are displayed in a tiled manner.

By means of cascaded display, an area occupied by file icon display may be reduced, and by means of tiled display, the user may check file information, for example, the file type of the currently selected object file by means of the file icon.

In practical use, an area of the application icon in the second sub-area may be reduced, or an interval between two adjacent application icons may be reduced, such that the first sub-area may be added without reducing the application icons, so as to improve a utilization rate of an area of the second display area.

In some examples, the first sub-area and the second sub-area are located at two ends of an edge 70 of the first display area respectively. As shown in FIGS. 3, 5, 6, 7 and 8, the first sub-area 21 and the second sub-area 22 are distributed side by side, such that the first sub-area 21 and second sub-area 22 distributed this way facilitate distinguishing between the file icon 40 and the application icon 30, and misoperation is reduced.

The first display area may be an application interface of an application corresponding to the application icon in the second sub-area or not, for example, the first display area is an application interface of a corresponding application in a desktop application list.

Figure 3:
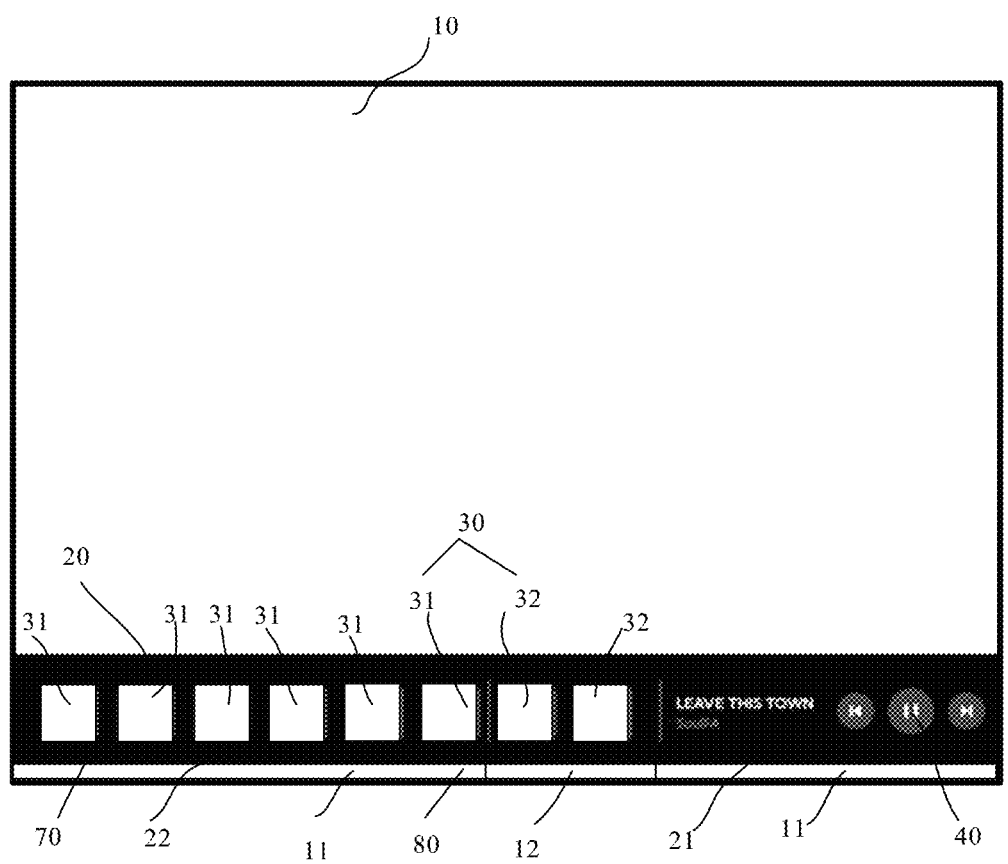
FIG. 3 is a second schematic diagram of a user interface of an electronic device illustrated according to an example.
Figure 6:
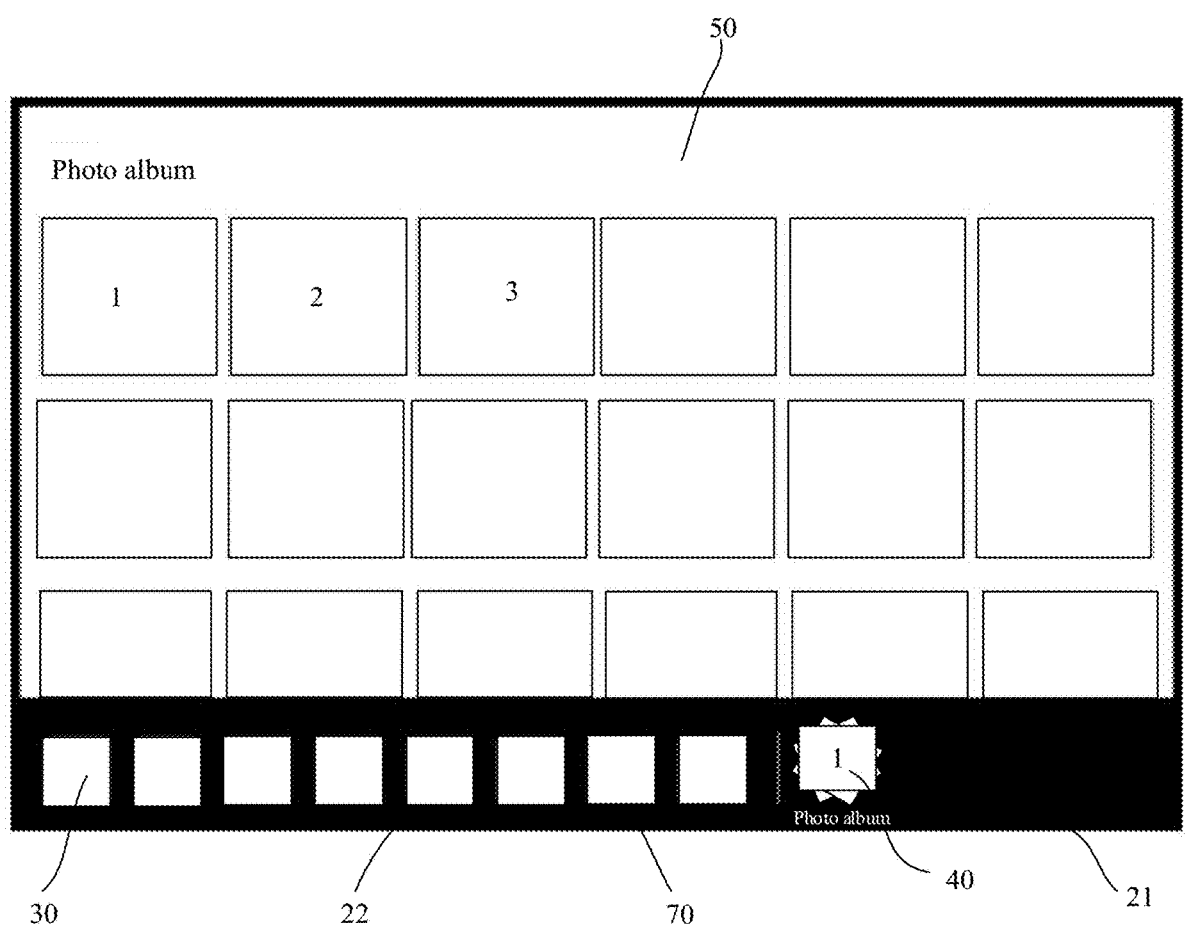
FIG. 6 is a fifth schematic diagram of a user interface of an electronic device illustrated according to an example.

FIG. 3 illustratively shows that the file icon 40 of the object file is a file icon of an audio file. FIG. 6 illustratively shows that the file icon 40 of the object file is a file icon of an image file.

In S120, the first operation includes but is not limited to a click operation, a slide operation, a drag operation or a long press operation, etc. The click operation may be a single click operation or a multi-click operation. The first operation is used for starting the object application, and the first display area is switched to an application interface of the object application.

When the first operation is executed, the second display area is still displayed instead of being hidden, in such a case, the object file may be quickly checked in the first sub-area, the object application may be quickly found in the first sub-area, no new interface needs to be opened anew to find the object application, and when the object file needs to be transmitted to the object application, transmission operation based on the object file across applications is facilitated.

In some examples, after the application interface of the object application is displayed in the first display area, the method further includes:

hide the second display area.

After the first display area is switched to the application interface, the second display area is immediately hidden, so as to obtain a better display effect on the application interface. Especially for a full-screen electronic device, after a new interface (including but not limited to the application interface corresponding to the object application) is opened, the second display area is hidden, and the newly opened interface may obtain a maximum display area. In such a case, before S130 is executed, recalling the second display area is needed.

This example is more suitable for an application scenario where an interval between S120 and S130 is long. For example, after the file icon is displayed in the second display area, under the condition that the object file does not need to be transmitted to the application interface temporarily, that is, S130 is not executed temporarily, better display experience may be obtained by hiding the second display area.

In some examples, after an application interface of an object application is displayed in the first display area, the method further includes:

display the second display area in a preset time; and
hide the second display area under the condition that no touch operation acting in the second display area is detected in the preset time.

In this example, after the display screen displays the application interface, the second display area does not need to be hidden immediately, and a second display interface continues to be displayed in the application interface for the preset time. Under the condition that the touch operation is detected in the preset time, it means that the application icon or the file icon in the second display area needs to be used, and the operation of recalling the second display area is reduced.

Under the condition that the touch operation is not detected in the preset time, it means that no application icon or file icon in the second display area needs to be used, and in such a case, the second display area is hidden to obtain the better display effect on the application interface.

Without limitation, the preset time may be 1 s, 2 s, 3 s, 4 s, 5 s, etc.

The touch operation includes but is not limited to a click operation, a slide operation, a drag operation or a long press operation, etc.

In S130, the second operation includes but is not limited to a click operation, a slide operation, a drag operation or a long press operation, etc.

In S140, different object applications may process the object file differently.

Figure 7:
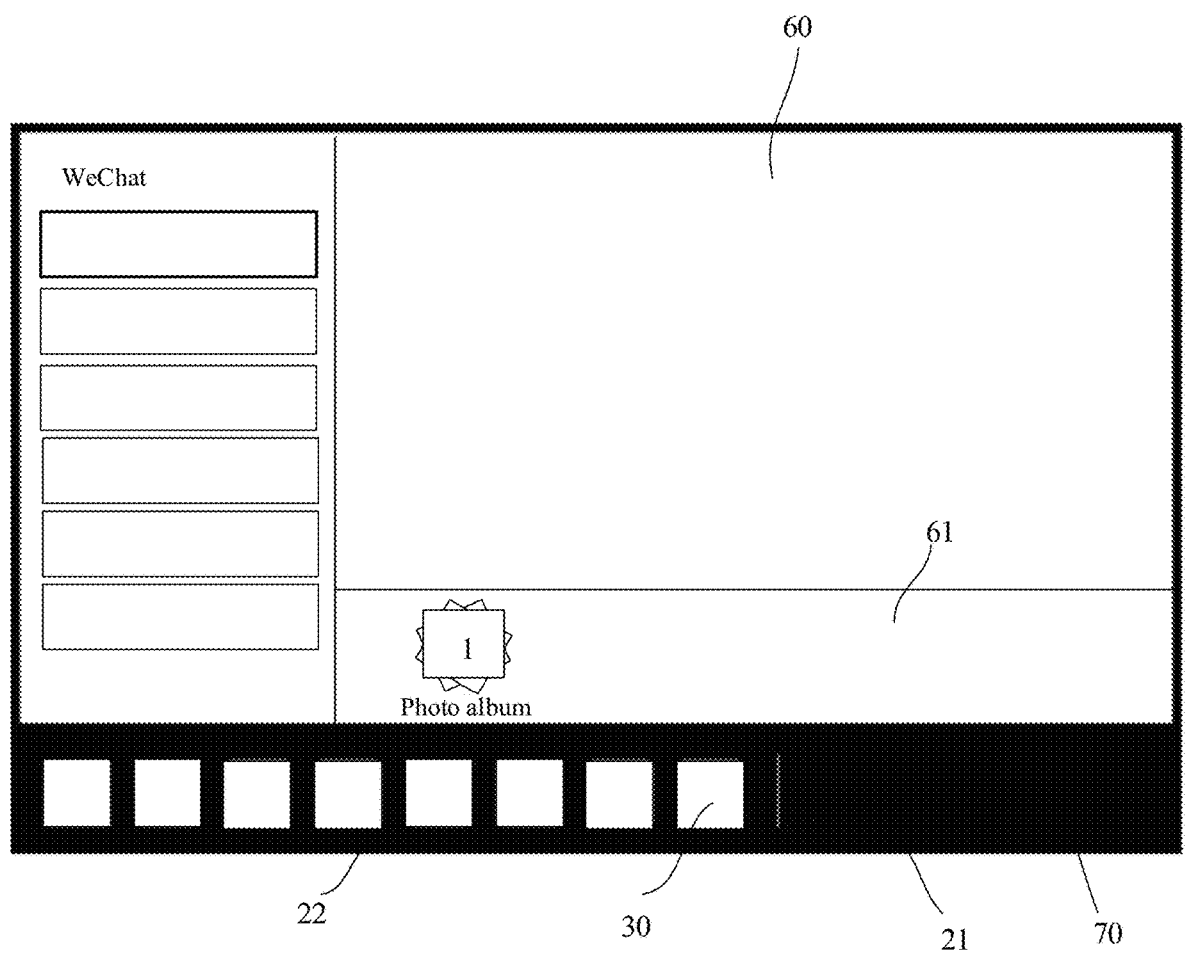
FIG. 7 is a sixth schematic diagram of a user interface of an electronic device illustrated according to an example.
Figure 8:
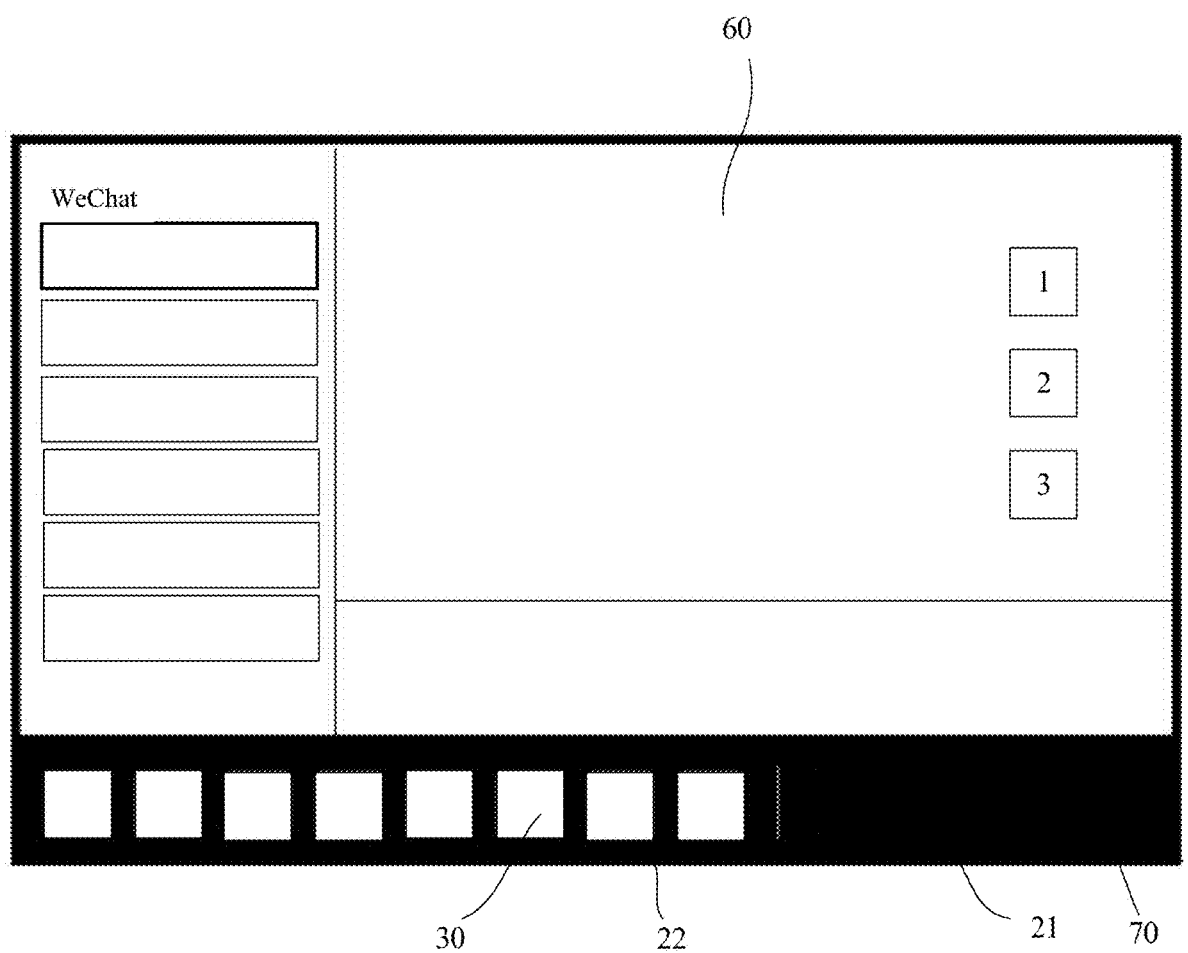
FIG. 8 is a seventh schematic diagram of a user interface of an electronic device illustrated according to an example.

For example, processing of the object file by the object application includes at least one of editing, sending or sharing. For example, when the application is a WeChat application, as shown in FIGS. 7 and 8, the object file may be sent out after it is detected that a click operation is received by a sending control in the application interface 60. When the application is an image retouching application, image retouching editing may be carried out on the object file.

In the example of the disclosure, a first sub-area is added in a second display area, and the first sub-area serves as a "transfer station", to transmit an object file in a first display area to an object application. With the first sub-area added as an interaction area, functions of the second display area are enriched, and an area utilization rate of the second display area is improved. When the object file needs to be transmitted to the object application, the object file may be quickly checked in the first sub-area, the object application may be quickly found in the second display area, and no new interface needs to be opened anew to find the object application, such that a transmission operation based on the object file across applications is facilitated.

In an example, the second sub-area displays the application icon, the application icon includes:

a first type of application icon and/or a second type of application icon displayed in the second sub-area,
an application corresponding to the first type of application icon is determined according to pre-configuration, and
an application corresponding to the second type of application icon is determined according to a running state of the application, where a display parameter of the first type of application icon is different from that of the second type of application icon.

Under the condition that the plurality of first type of application icons are provided, the plurality of first type of application icons are displayed in a centralized manner; and under the condition that the plurality of second type of application icons are provided, the second type of application icons are displayed in a centralized manner.

As shown in FIG. 3, the plurality of first type of application icons 31 are displayed in a centralized manner, and the plurality of second type of application icons 32 are displayed in a centralized manner, where the second type of application icons 32 are located between the first type of application icons 31 and the file icon 40.

The application corresponding to the first type of application icon is determined according to pre-configuration, and the pre-configuration may be written when the electronic device is delivered from a factory or written when a software code is updated; or, the application is pre-generated according to a user configuration operation.

Thus, the application corresponding to the first type of application icon may be a fixed pre-configured application.

The application corresponding to the second type of application icon is determined according to a running state of the application in the electronic device, such that the application corresponding to the second type of application icon may be determined in advance.

For example, the application corresponding to the second type of application icon may be an application with the highest use frequency in the electronic device or an application with the longest use duration, etc. This is an example, and specific implementations are not limited to the above examples.

A difference of the display parameters may be at least one of:

a display position difference;
a display brightness difference;
a display background color difference; and
a display line difference.

By means of the difference of the display parameters, a difference between two application icons is reflected visually, so as to facilitate an operation by a user.

In other examples, the application corresponding to the second type of application icon includes at least one of:

at least one application running in a background;
at least one application used in latest preset time; or
at least one application, ranking ahead of a preset priority and from a higher use frequency to a lower use frequency in all the applications used in unit time.

Compared with the application corresponding to the first type of application icon, the application corresponding to the second type of application icon may be automatically updated. For example, the application corresponding to the second type of application icon is an application running in the background, and under the condition that the application running in the background is changed, the application icon displayed in the second sub-area is changed accordingly.

The application corresponding to the second type of application icon may reflect a use habit of the user, and the second applications are different in the electronic devices of different users. The application corresponding to the second type of application icon effectively meets personalized requirements of different users, so as to further improve selection efficiency of the object application.

The latest preset time refers to a period of time closest to the current time displayed on the electronic device. The latest preset time may be 1 h, 2 h, 3 h, 5 h, 7 h, 10 h, 24 h, etc.

Without limitation, the unit time may also be a period of time closest to the current time displayed on the electronic device.

After the object file is transmitted to the object application to be processed by the object application, the method includes:

hide the file icon in the first sub-area.

As shown in FIGS. 6-7, after the object file 51 is transmitted to the object application, the file icon 40 is hidden, such that the area in the first sub-area 21 may be released in time, excessive file icons 40 in the first sub-area 21 are reduced, and the first sub-area 21 is more concise and clearer, so as to improve the use experience.

In other examples, the method further includes:

detect a third operation acting in a first preset area in a display screen; and display the second display area in a current display interface of the display screen when the third operation is detected, where the current display interface includes the first display area, or the current display interface includes the application interface of the object application.

In practical use, the third operation acting in the first preset area is used for calling the second display area. Under the condition that the file icon needs to be displayed in the first sub-area, the second display area needs to be called. Under the condition that no file icon needs to be displayed in the first sub-area, the second display area does not need to be called, and the second display area is in a hidden state, so as to guarantee that the first display area has a maximum display area in the display screen.

Figure 2:
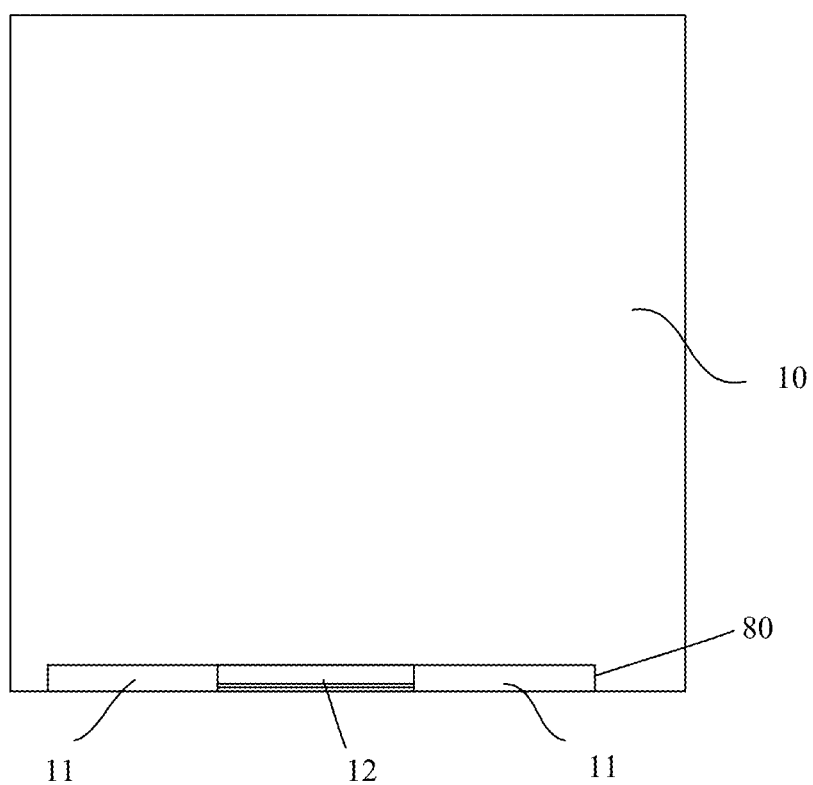
FIG. 2 is a first schematic diagram of a user interface of an electronic device illustrated according to an example.

Without limitation, the first preset area is located at an edge area 80 of the display screen. As shown in FIGS. 2 and 3, the first preset area 11 and the second display area 20 are both located at an identical edge of the display screen 10, and the first preset area 11 may at least partially overlap the second display area 20. In this way, occupation on the first display area 50 is reduced as much as possible while usage of the second display area 20 and the first preset area 11 is not influenced, and a display effect is further improved.

The third operation includes but is not limited to a click operation, a slide operation, a drag operation or a long press operation, etc.

In practical use, after a current display interface is switched, under the condition that the second display area is hidden, the second display interface needs to be called when the current display interface is switched. For example, after the first display area is displayed, the second display area is in a hidden state, and the second display area needs to be called; and after the file icon is displayed in the first sub-area and the first display area is switched to the application interface of the object application, the second display area is hidden again, and the second display area needs to be called anew.

In other examples, the method further includes:

detect a fourth operation acting in a second preset area in the display screen; and switch the current display interface to a desktop when the fourth operation is detected.

The fourth operation in the second preset area is used for switching the current display interface to the desktop.

The third operation includes but is not limited to a click operation, a slide operation, a drag operation or a long press operation, etc.

The second preset area may also be located at the edge area of the display screen.

The second preset area and the first preset area may be located at the identical edge area of the display screen, or the second preset area and the first preset area are located at different edges of the display screen. When the second preset area and the first preset area are located at the identical edge area of the display screen, occupation on the first display area may be further reduced, so as to further improve a display effect.

In other examples, the method further includes:

detect a fifth operation acting in a second preset area in the display screen; and switch the current display interface of the display screen to a multi-task management interface when the fifth operation is detected, where the current display interface includes the first display area, or the current display interface includes the application interface of the object application.

Two different functional operations may be executed by using the second preset area. The fifth operation is different from the fourth operation. For example, the fourth operation may be a slide operation, and the fifth operation be a slide and hover operation.

In the multi-task management interface, when the display interface of a background application is triggered, the triggered application may be run at a foreground of the electronic device, so as to further facilitate an operation across applications.

In other examples, the first preset areas are located at two ends of the second preset area respectively; and/or, the second preset area and the first preset areas are both located at an edge area of the display screen.

Figure 4:
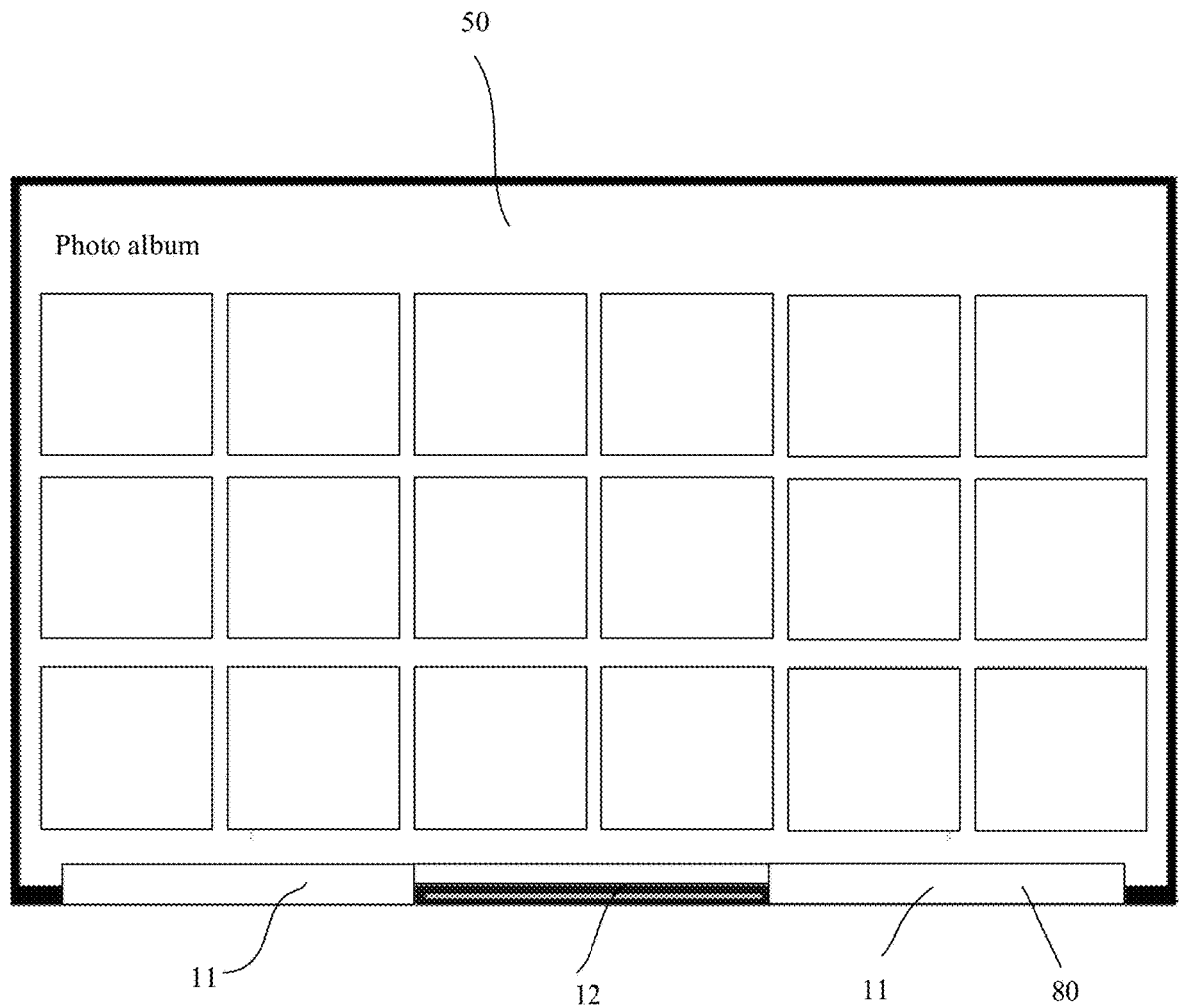
FIG. 4 is a third schematic diagram of a user interface of an electronic device illustrated according to an example.

FIGS. 2 to 4 illustratively show two first preset areas 11 located at two ends of the second preset area 12.

The edge of the display screen is divided into the first preset areas and the second preset area, so as to reduce misoperation. For example, under the condition that the edge area of the display screen is not divided into the first preset areas and the second preset area, and when the application is opened and the second display area needs to be called, the current display interface may be switched to the desktop mistakenly.

In other examples, the step of displaying, based on the object file selected in the first display area, the file icon in the first sub-areas of a second display area includes:

detect a sixth operation for the object file selected in the first display area; and display the file icon in the first sub-area when the sixth operation is detected.

The sixth operation includes but is not limited to a click operation, a slide operation, a drag operation or a long press operation, etc.

For example, the selected object file in the first display area may be dragged into the first sub-area by means of the drag operation, and after the drag operation is released, the file icon is displayed in the first sub-area.

Figure 5:
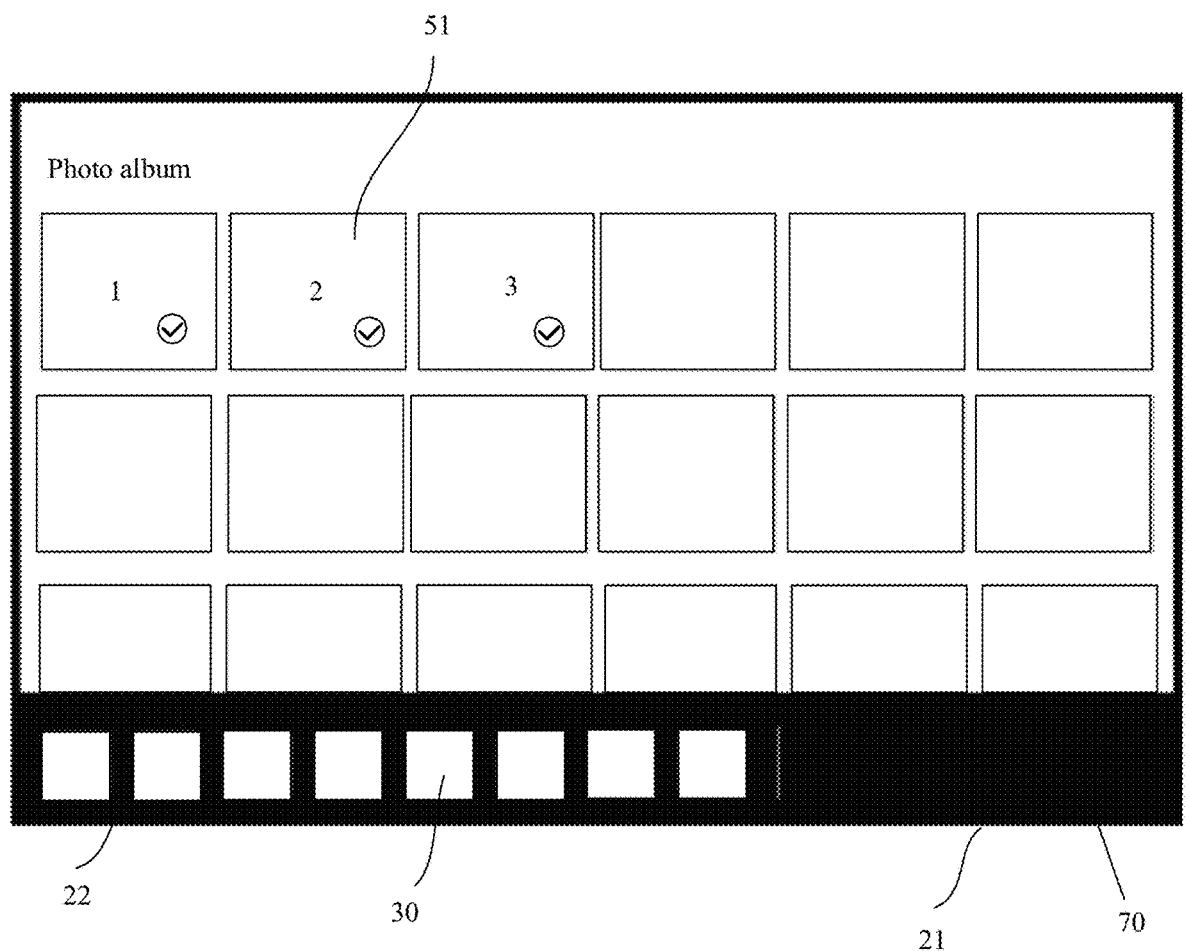
FIG. 5 is a fourth schematic diagram of a user interface of an electronic device illustrated according to an example.
Figure 9:
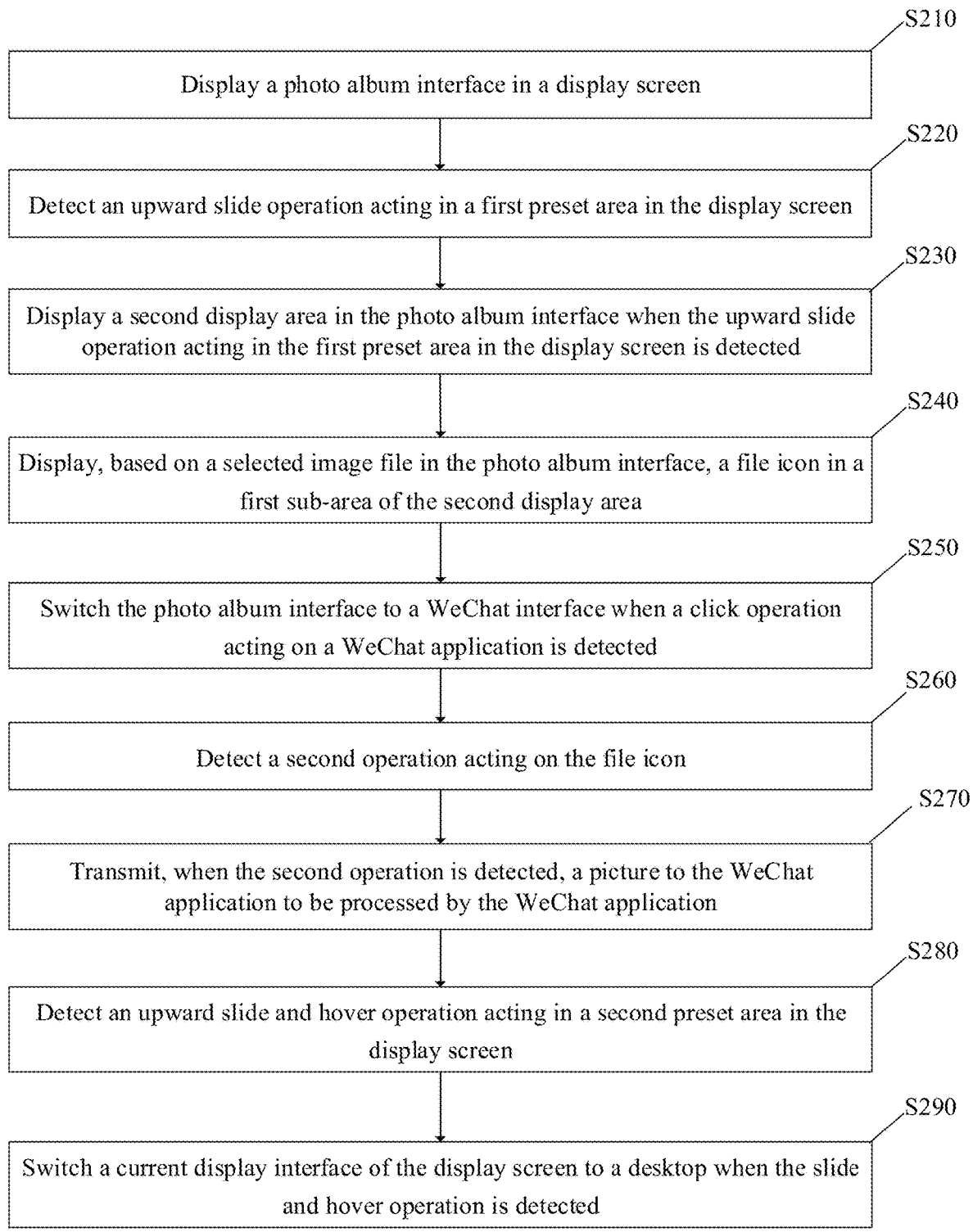
FIG. 9 is a second flowchart of the information processing method illustrated according to an example.

In a specific example, as shown in FIG. 9, an information processing method provided in this example is used in a tablet computer and includes:

S210, display a photo album interface (that is, a first display area) in a display screen, where a plurality of photo albums are displayed on the photo album interface;

S220, detect an upward slide operation (that is, a third operation) acting in a first preset area in the display screen;

S230, display a second display area 20 in the photo album interface when the upward slide operation acting in the first preset area in the display screen is detected, where as shown in FIG. 5, the second display area 20 includes a first sub-area 21 and a second sub-area 22, the first sub-area 21 is a blank area, and the second sub-area 22 displays a plurality of application icons;

S240, display, based on a selected image file (that is, an object file 51) in the photo album interface, a file icon in the first sub-area of the second display area 20, where as shown in FIGS. 5-6, the file icons are displayed in the first sub-area 21 by dragging the selected first image file, second image file and third image file;

S250, switch the photo album interface to a WeChat interface (that is, an application interface of an object application) when a click operation (that is, a first operation) acting on a WeChat application (that is, the object application) is detected;

S260, detect a second operation acting on the file icon;

S270, transmit, when the second operation is detected, the image file to the WeChat application to be processed by the WeChat application, where as shown in FIGS. 7-8, the file icon is displayed in a dialog box 61 in the WeChat interface, and the image file is sent when the click operation acting on a sending control on the WeChat interface is detected;

S280, detect an upward slide and hover operation (that is, a fourth operation) acting in a second preset area in the display screen; and S290, switch a current display interface of the display screen to a desktop when the slide and hover operation is detected, where the current display interface includes the WeChat interface and the second display area.

Figure 10:
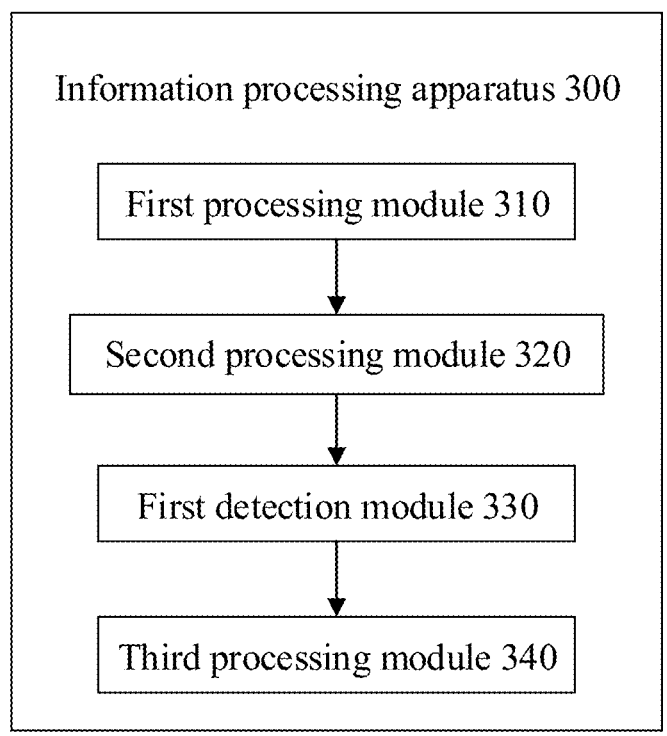
FIG. 10 is a structural schematic diagram of an information processing apparatus illustrated according to an example.

An example in a second aspect of the disclosure provides an information processing apparatus. As shown in FIG. 10, the apparatus 300 includes:

a first processing module 310 configured to display, based on an object file selected in a first display area, a file icon in a first sub-area of a second display area, where the file icon is an icon corresponding to the object file, the second display area is located at an edge of the first display area, the second display area further includes a second sub-area, and an application icon is displayed in the second sub-area;

a second processing module 320 configured to display an application interface of an object application in the first display area when a first operation acting on the application icon is detected, where the object application is an application corresponding to the application icon on which the first operation acts;

a first detection module 330 configured to detect a second operation acting on the file icon; and a third processing module 340 configured to transmit, when the second operation is detected, the object file to the object application to be processed by the object application.

In other examples, the apparatus further includes:

a hiding module configured to hide, after the object file is transmitted to the object application to be processed by the object application, the file icon in the first sub-area.

In other examples, the apparatus further includes:

a second detection module configured to detect a third operation acting in a first preset area in a display screen; and a fourth processing module configured to display the second display area in a current display interface of the display screen when the third operation is detected, where the current display interface includes the first display area, or the current display interface includes the application interface of the object application.

In other examples, the apparatus further includes:

a third detection module configured to detect a fourth operation acting in a second preset area in the display screen; and a fifth processing module configured to switch the current display interface to a desktop when the fourth operation is detected.

In other examples, the apparatus further includes:

a fourth detection module configured to detect a fifth operation acting in the second preset area in the display screen; and a sixth processing module configured to switch the current display interface of the display screen to a multi-task management interface when the fifth operation is detected, where the current display interface includes the first display area, or the current display interface includes the application interface of the object application.

In other examples, the first processing module is further configured to detect a sixth operation for the object file selected in the first display area; and display the file icon in the first sub-area when the sixth operation is detected.

In the examples of the disclosure, the electronic device includes but is not limited to a mobile phone, a tablet computer, a notebook computer, a television, a wearable device, etc.

An example in a third aspect of the disclosure provides an electronic device. The electronic device includes:

a processor, and a memory configured to store a processor-instruction, where the processor is configured to execute steps of the method in the example in a first aspect when implemented.

An example in a fourth aspect of the disclosure provides a computer-readable storage medium storing a computer program. When an instruction in the storage medium is executed by a processor of an electronic device, the electronic device can execute and implement steps of the method in the example in the first aspect.

In an illustrative example, a plurality of modules in the information processing apparatus may be implemented by one or more of a central processing unit (CPU), a graphics processing unit (GPU), a baseband processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a micro controller unit (MCU), a microprocessor, or other electronic components, so as to execute the method.

Figure 11:
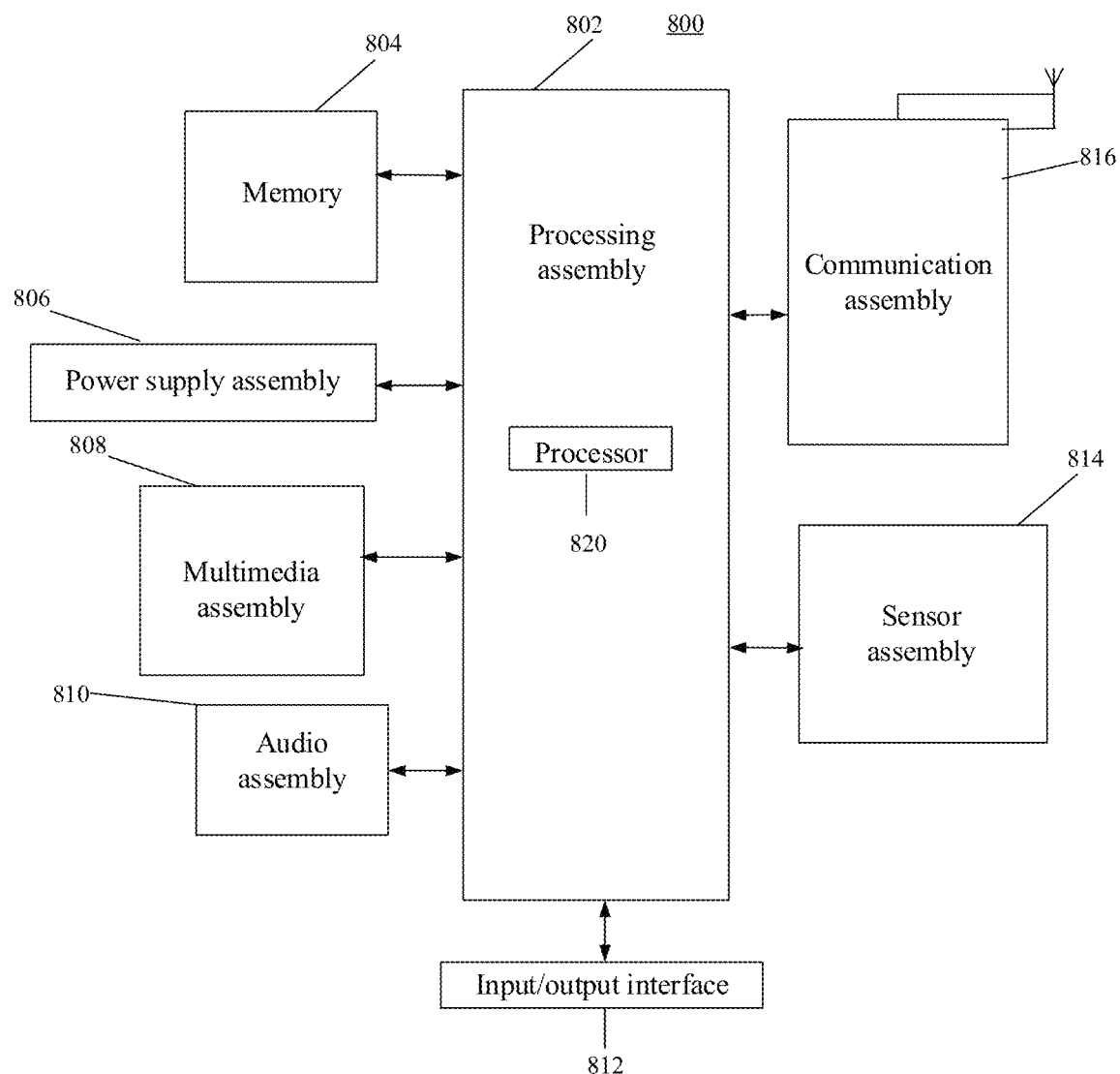
FIG. 11 is a block diagram of a component structure of an information processing apparatus illustrated according to an example.

FIG. 11 is a block diagram of an information processing apparatus 800 according to an example. For example, the apparatus 800 may be a mobile phone, a computer, a digital broadcast terminal, a messaging apparatus, a gaming console, a tablet apparatus, a medical apparatus, a fitness apparatus, a personal digital assistant, etc.

With reference to FIG. 11, the apparatus 800 may include one or more of a processing assembly 802, a memory 804, a power supply assembly 806, a multimedia assembly 808, an audio assembly 810, an input/output (I/O) interface 812, a sensor assembly 814, and a communication assembly 816.

The processing assembly 802 generally controls overall operation of the apparatus 800, for example, operations associated with display, phone calls, data communications, camera operations, and recording operations. The processing assembly 802 may include one or more processors 820 to execute an instruction to complete all or some steps of the method above. Moreover, the processing assembly 802 may include one or more modules to facilitate interaction between the processing assembly 802 and other assemblies. For example, the processing assembly 802 may include the multimedia module to facilitate interaction between the multimedia assembly 808 and the processing assembly 802.

The memory 804 is configured to store various types of data to support an operation on the apparatus 800. Examples of such data include an instruction, operated on the apparatus 800, for any application or method, contact data, phonebook data, messages, pictures, videos, etc. The memory 804 may be implemented by any type of volatile or non-volatile memory apparatus, or a combination of them, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 806 provides power for the various assemblies of the apparatus 800. The power supply assembly 806 may include a power management system, one or more power supplies, and other assemblies associated with power generation, management, and distribution for the apparatus 800.

The multimedia assembly 808 includes a screen that provides an output interface between the apparatus 800 and the user. In some examples, the screen may include a liquid crystal display (LCD) and a touch panel (TP). Under the condition that the screen includes the touch panel, the screen may be implemented as a touch screen to receive an input signal from the user. The touch panel includes one or more touch sensors to sense touches, slides, and gestures on the touch panel. The touch sensor may not only sense a boundary of a touch or slide action, but also detect duration and pressure related to the touch or slide operation. In some examples, the multimedia assembly 808 includes a front-facing camera and/or a rear-facing camera. When the apparatus 800 is in an operational mode, for example, a photographing mode or a video mode, the front-facing camera and/or the rear-facing camera may receive external multimedia data. Each of the front-facing camera and the rear-facing camera may be a fixed optical lens system or have a focal length and optical zoom capacity.

The audio assembly 810 is configured to output and/or input an audio signal. For example, the audio assembly 810 includes a microphone (MIC) configured to receive an external audio signal when the apparatus 800 is in the operational mode, for example, a calling mode, a recording mode, and a speech recognition mode. The received audio signal may be further stored in the memory 804 or transmitted via the communication assembly 816. In some examples, the audio assembly 810 further includes a speaker for outputting the audio signal.

The I/O interface 812 provides an interface between the processing assembly 802 and a peripheral interface module, which may be a keyboard, a click wheel, a button, etc. These buttons may include, but are not limited to: a home button, a volume button, a start button, and a lock button.

The sensor assembly 814 includes one or more sensors for providing state assessments of various aspects for the apparatus 800. For example, the sensor assembly 814 may detect an on/off state of the apparatus 800 and relative positioning of the assemblies. For example, the assemblies are a display and a keypad of the apparatus 800. The sensor assembly 814 may also detect a change in position of the apparatus 800 or an assembly of the apparatus 800, the presence or absence of contact between the user and the apparatus 800, orientation or acceleration/deceleration of the apparatus 800, and temperature variation of the apparatus 800. The sensor assembly 814 may include a proximity sensor configured to detect presence of nearby objects in the absence of any physical contact. The sensor assembly 814 may also include a light sensor, for instance, a complementary metal oxide semiconductor (CMOS) or charge coupled device (CCD) image sensor, for use in imaging applications. In some examples, the sensor assembly 814 may also include an acceleration sensor, a gyroscopic sensor, a magnetic sensor, a pressure sensor, or a temperature sensor.

The communication assembly 816 is configured to facilitate communication between the apparatus 800 and other apparatuses in a wired or wireless manner. The apparatus 800 may access a wireless network based on a communication standard, for example, WiFi, 4G, or 5G, or a combination of them. In one illustrative example, the communication assembly 816 receives a broadcast signal or broadcast related information from an external broadcast management system via a broadcast channel. In one illustrative example, the communication assembly 816 also includes a near field communication (NFC) module to facilitate short-range communication. For example, the NFC module may be implemented based on a radio frequency identification (RFID) technology, an infrared data association (IrDA) technology, an ultra-wide band (UWB) technology, a Bluetooth (BT) technology, and other technologies.

In the example, the apparatus 800 may be implemented by one or more application specific integrated circuits (ASIC), a digital signal processor (DSP), a digital signal processing device (DSPD), a programmable logic device (PLD), a field programmable gate array (FPGA), a controller, a microcontroller, a microprocessor, or other electronic elements for executing the method above.

In the example, further provided is a non-transitory computer-readable storage medium including an instruction, for example, a memory 804 including an instruction, and the instruction may be executed by the processor 820 of the apparatus 800 so as to execute the method above. For example, the non-transitory computer-readable storage medium may be a read-only memory (ROM), a random access memory (RAM), a compact disc read-only memory (CD-ROM), a magnetic tape, a floppy disk, an optical data storage apparatus, etc.

The methods disclosed in several method examples provided in the disclosure may be arbitrarily combined without conflict to obtain new method examples.

The features disclosed in several device examples provided in the disclosure may be arbitrarily combined without conflict to obtain new product examples.

The features disclosed in several method or device examples provided in the disclosure may be arbitrarily combined without conflict to obtain new method examples or product examples.

Other examples of the disclosure will readily occur to those skilled in the art upon consideration of the specification and practical disclosure. The disclosure is intended to cover any variations, uses, or adaptations of the disclosure, and these variations, uses, or adaptations follow general principles of the disclosure and include common general knowledge or customary technical means in the technical field not disclosed in the disclosure.

It should be understood that the disclosure is not limited to the precise structure that has been described above and shown in the accompanying drawings, and that various modifications and changes may be made without departing from its scope. The scope of the disclosure is limited by the appended claims.

What is claimed is:

1. An information processing method, comprising:
   displaying, based on at least one object file selected in a first display area, at least one file icon in a first sub-area of a second display area, wherein the at least one file icon is an icon corresponding to a type of the at least one object file, wherein under the condition that a plurality of object files are selected, file icons corresponding to the plurality of object files of a same type are displayed in a centralized manner, and display parameters of file icons corresponding to object files of different types are different, wherein the second display area is located at an edge of the first display area, the second display area further comprises a second sub-area, and at least one application icon is displayed in the second sub-area;
   displaying an application interface of an object application in the first display area in response to detecting a first operation acting on the at least one application icon, wherein the object application is an application corresponding to the at least one application icon on which the first operation acts;
   detecting a second operation acting on the at least one file icon;
   and transmitting, in response to detecting the second operation, the at least one object file to the object application to be processed by the object application;
   wherein displaying, based on the at least one object file selected in the first display area, the at least one file icon in the first sub-area of the second display area comprises:
   detecting a third operation for the at least one object file selected in the first display area;
   and displaying the at least one file icon in the first sub-area in response to detecting the third operation.

2. The method according to claim 1, wherein the at least one application icon is displayed in the second sub-area, and the at least one application icon comprises:
   a first type of application icon or a second type of application icon displayed in the second sub-area;
   an application corresponding to the first type of application icon determined according to pre-configuration;
   and an application corresponding to the second type of application icon determined according to a running state of the application, wherein a display parameter of the first type of application icon is different from a display parameter of the second type of application icon.

3. The method according to claim 2, wherein the application corresponding to the second type of application icon comprises at least one of:
   at least one application running in a background;
   at least one application used in latest preset time;
   or at least one application, ranking ahead of a preset priority and from a higher use frequency to a lower use frequency in all the applications used in unit time.

4. The method according to claim 1, wherein after transmitting the at least one object file to the object application to be processed by the object application, the method comprises:
   hiding the at least one file icon in the first sub-area.

5. The method according to claim 1, further comprising:
   detecting a fourth operation acting in first preset areas in a display screen;
   and displaying the second display area in a current display interface of the display screen in response to detecting the fourth operation, wherein the current display interface comprises the first display area, or the current display interface comprises the application interface of the object application.

6. The method according to claim 5, further comprising:
   detecting a fifth operation acting in a second preset area in the display screen;
   and switching the current display interface to a desktop in response to detecting the fifth operation.

7. The method according to claim 5, further comprising:
   detecting a sixth operation acting in a second preset area in the display screen;
   and switching the current display interface of the display screen to a multi-task management interface in response to detecting the sixth operation, wherein the current display interface comprises the first display area, or the current display interface comprises the application interface of the object application.

8. The method according to claim 6, wherein the first preset areas are located at two ends of the second preset area respectively.

9. The method according to claim 6, wherein the second preset area and the first preset areas are both located at an edge area of the display screen.

10. An electronic device, comprising:
    a processor, and a memory configured to store a processor-executable instruction;
    wherein the processor is configured to:
    display, based on at least one object file selected in a first display area, at least one file icon in a first sub-area of a second display area, wherein the at least one file icon is an icon corresponding to a type of the at least one object file, wherein under the condition that a plurality of object files are selected, file icons corresponding to the plurality of object files of a same type are displayed in a centralized manner, and display parameters of file icons corresponding to object files of different types are different, wherein the second display area is located at an edge of the first display area, the second display area further comprises a second sub-area, and at least one application icon is displayed in the second sub-area;
    display an application interface of an object application in the first display area in response to detecting a first operation acting on the at least one application icon, wherein the object application is an application corresponding to the at least one application icon on which the first operation acts;
    detect a second operation acting on the at least one file icon;
    and transmit, in response to detecting the second operation, the at least one object file to the object application to be processed by the object application;
    wherein, for displaying the at least one file icon in the first sub-area of the second display area file icon, the processor is further configured to:
    detect a third operation for the at least one object file selected in the first display area;
    and display the at least one file icon in the first sub-area in response to detecting the third operation.

11. The electronic device according to claim 10, wherein the at least one application icon is displayed in the second sub-area, and the at least one application icon comprises:

a first type of application icon or a second type of application icon displayed in the second sub-area;
an application corresponding to the first type of application icon is determined according to pre-configuration;
and an application corresponding to the second type of application icon is determined according to a running state of the application, wherein a display parameter of the first type of application icon is different from a display parameter of the second type of application icon.

12. The electronic device according to claim 11, wherein the application corresponding to the second type of application icon comprises at least one of:
at least one application running in a background;
at least one application used in latest preset time;
or at least one application, ranking ahead of a preset priority and from a higher use frequency to a lower use frequency in all the applications used in unit time.

13. The electronic device according to claim 10, wherein the processor is further configured to:
hide the at least one file icon in the first sub-area.

14. The electronic device according to claim 10, wherein the processor is further configured to:
detect a fourth operation acting in first preset areas in a display screen;
and display the second display area in a current display interface of the display screen in response to detecting the fourth operation, wherein the current display interface comprises the first display area, or the current display interface comprises the application interface of the object application.

15. The electronic device according to claim 14, wherein the processor is further configured to:
detect a fifth operation acting in a second preset area in the display screen;
and switch the current display interface to a desktop in response to detecting the fifth operation.

16. The electronic device according to claim 14, wherein the processor is further configured to:
detect a sixth operation acting in a second preset area in the display screen;
and switch the current display interface of the display screen to a multi-task management interface in response to detecting the sixth operation, wherein the current display interface comprises the first display area, or the current display interface comprises the application interface of the object application.

17. A non-transitory computer-readable storage medium storing a computer program, wherein when an instruction in the storage medium is executed by a processor of an electronic device, the electronic device is configured to:
display, based on at least one object file selected in a first display area, at least one file icon in a first sub-area of a second display area, wherein the at least one file icon is an icon corresponding to a type of the at least one object file, wherein under the condition that a plurality of object files are selected, file icons corresponding to the plurality of object files of a same type are displayed in a centralized manner, and display parameters of file icons corresponding to object files of different types are different, wherein the second display area is located at an edge of the first display area, the second display area further comprises a second sub-area, and at least one application icon is displayed in the second sub-area;
display an application interface of an object application in the first display area in response to detecting a first operation acting on the at least one application icon, wherein the object application is an application corresponding to the at least one application icon on which the first operation acts;
detect a second operation acting on the at least one file icon;
and transmit, in response to detecting the second operation, the at least one object file to the object application to be processed by the object application;
wherein, for displaying the at least one file icon in the first sub-area of the second display area, the electronic device is further configured to:
detect a third operation for the at least one object file selected in the first display area;
and display the at least one file icon in the first sub-area in response to detecting the third operation.

18. The method according to claim 1, wherein a difference of the display parameters comprises at least one of following differences:
a display position difference;
a display brightness difference;
a display background color difference;
and a display line difference.

19. The electronic device according to claim 10, wherein a difference of the display parameters comprises at least one of following differences:
a display position difference;
a display brightness difference;
a display background color difference;
and a display line difference.

* * * * *